United States Patent
Johnson, Sr.

(10) Patent No.: US 10,357,906 B2
(45) Date of Patent: Jul. 23, 2019

(54) METHOD OF PRODUCING COMPOSITE MEMBERS HAVING INCREASED STRENGTH

(75) Inventor: William L. Johnson, Sr., Grove, OK (US)

(73) Assignee: Ecopuro, LLC, Denver, CO (US)

( * ) Notice: Subject to any disclaimer, the term of this patent is extended or adjusted under 35 U.S.C. 154(b) by 0 days.

(21) Appl. No.: 13/111,680

(22) Filed: May 19, 2011

(65) Prior Publication Data

US 2011/0268876 A1 Nov. 3, 2011

Related U.S. Application Data

(62) Division of application No. 11/507,358, filed on Aug. 21, 2006, now abandoned.

(Continued)

(51) Int. Cl.
*B29C 47/00* (2006.01)
*B29C 44/18* (2006.01)
(Continued)

(52) U.S. Cl.
CPC .......... *B29C 44/186* (2013.01); *B29C 44/128* (2013.01); *B29C 44/3411* (2013.01);
(Continued)

(58) Field of Classification Search
CPC ..... B29C 44/00; B29C 47/0028; B29C 44/12; B29C 44/186; B29C 2948/92561
(Continued)

(56) References Cited

U.S. PATENT DOCUMENTS 3,192,294 A 6/1965 Streed et al.
3,274,315 A 9/1966 Kawamura
(Continued)

FOREIGN PATENT DOCUMENTS

DE 1154264 9/1963
DE 1504444 3/1972
(Continued)

OTHER PUBLICATIONS

Trevor Grundberg, "Foam Core Materials in the Marine Industry", "www.boatdesign.net", Published in: US.
(Continued)

*Primary Examiner* — Matthew J Daniels
(74) *Attorney, Agent, or Firm* — James F. Lea, III; Gable Gotwals

(57) ABSTRACT

This invention relates to extruded composite materials specifically focusing on the increasing load bearing capacity and the overall strength of composites. Injectable conformable structural core materials are used to replace foam cells inside extruded composite materials thereby increasing the overall load bearing stability and strength. The core materials are tailored to have a desired CTE with respect to the structural materials. The core materials may also incorporate fibers and solid structural fillers for increasing the strength of the composite member. The objective is to enable composite materials to have the highest structural load bearing capability possible so that these technologies can be used as the replacement of wood, in aerospace applications and for other purposes.

22 Claims, 6 Drawing Sheets

Related U.S. Application Data

(60) Provisional application No. 60/709,628, filed on Aug. 19, 2005.

(51) Int. Cl.
  *B29C 44/12* (2006.01)
  *B29C 44/34* (2006.01)
  *B29C 48/30* (2019.01)
  *B29C 48/11* (2019.01)
  B29K 105/04 (2006.01)
  B29L 31/60 (2006.01)

(52) U.S. Cl.
  CPC .............. *B29C 48/11* (2019.02); *B29C 48/30* (2019.02); *B29C 48/304* (2019.02); B29C 2948/926 (2019.02); B29C 2948/9298 (2019.02); B29C 2948/92561 (2019.02); B29C 2948/92761 (2019.02); B29C 2948/92952 (2019.02); B29K 2105/04 (2013.01); B29L 2031/60 (2013.01)

(58) Field of Classification Search
  USPC .................................. 264/45.3, 131; 427/194
  See application file for complete search history.

(56) References Cited

U.S. PATENT DOCUMENTS

| | | | |
|---|---|---|---|
| 3,644,168 A * | 2/1972 | Bonk | B29C 44/0407 264/41 |
| 3,668,288 A | 6/1972 | Takahashi | |
| 3,764,245 A | 10/1973 | Miyamoto | |
| 3,812,230 A | 5/1974 | Takahashi | |
| 3,881,984 A | 5/1975 | Soda et al. | |
| 3,888,647 A | 6/1975 | Breeden et al. | |
| 3,929,951 A | 12/1975 | Shibata et al. | |
| 3,935,357 A | 1/1976 | Padovani | |
| 3,957,250 A | 5/1976 | Murphy | |
| 4,082,702 A | 4/1978 | Harper | |
| 4,211,848 A * | 7/1980 | Blount | C01B 33/00 264/45.3 |
| 4,281,492 A | 8/1981 | Schock et al. | |
| 4,304,080 A | 12/1981 | Freeman | |
| 4,344,381 A | 8/1982 | Ostrowski et al. | |
| 4,377,646 A | 3/1983 | Blount | |
| 4,403,502 A * | 9/1983 | Lindt | G01N 11/04 73/290 V |
| 4,595,623 A * | 6/1986 | Du Pont et al. | 428/195.1 |
| 4,602,765 A | 7/1986 | Loper et al. | |
| 4,795,666 A | 1/1989 | Okada et al. | |
| 4,837,251 A * | 6/1989 | Okey et al. | 523/218 |
| 4,978,562 A | 12/1990 | Wycech | |
| 5,216,038 A | 6/1993 | Gotoh | |
| 5,253,458 A | 10/1993 | Christian | |
| 5,294,472 A | 3/1994 | Arnold et al. | |
| 5,412,915 A | 5/1995 | Johnson | |
| 5,613,339 A * | 3/1997 | Pollock | 52/836 |
| 5,658,644 A | 8/1997 | Ho et al. | |
| 5,660,016 A | 8/1997 | Erwin et al. | |
| 5,665,284 A | 9/1997 | Erwin et al. | |
| 5,707,571 A * | 1/1998 | Reedy | 264/45.3 |
| 5,713,165 A | 2/1998 | Erwin | |
| 5,728,330 A | 3/1998 | Erwin et al. | |
| 5,783,125 A | 7/1998 | Bastone et al. | |
| 5,783,286 A | 7/1998 | Dinicola | |
| 5,804,353 A | 9/1998 | Cushner et al. | |
| 5,868,983 A | 2/1999 | Vogl et al. | |
| 5,935,680 A * | 8/1999 | Childress | 428/119 |
| 5,953,878 A | 9/1999 | Johnson | |
| 5,972,475 A | 10/1999 | Beekman | |
| 6,218,442 B1 * | 4/2001 | Hilborn et al. | 521/85 |
| 6,226,944 B1 | 5/2001 | Peshkam et al. | |
| 6,233,892 B1 | 5/2001 | Tylman | |
| 6,301,842 B1 | 10/2001 | Chaney et al. | |
| 6,347,494 B1 | 2/2002 | Noirot | |
| 6,403,222 B1 | 6/2002 | Harrison | |
| 6,455,126 B1 | 9/2002 | Wycech | |
| 6,649,264 B1 | 11/2003 | Vodermayer | |
| 6,659,020 B1 | 12/2003 | Ball | |
| 6,673,415 B1 * | 1/2004 | Yamazaki et al. | 428/117 |
| 6,735,916 B2 | 5/2004 | Peshkam et al. | |
| 6,759,114 B2 | 7/2004 | Wu et al. | |
| 6,818,163 B1 | 11/2004 | Fibiger et al. | |
| 6,844,040 B2 | 1/2005 | Pabedinskas et al. | |
| 6,921,789 B2 | 7/2005 | Booth et al. | |
| 6,931,803 B1 | 8/2005 | Davis et al. | |
| 6,986,934 B2 | 1/2006 | Chen et al. | |
| 7,763,341 B2 | 7/2010 | Brown | |
| 2003/0153669 A1 | 8/2003 | Brother et al. | |
| 2003/0168763 A1 * | 9/2003 | Kobayashi | 264/41 |
| 2003/0198775 A1 * | 10/2003 | Roth et al. | 428/68 |
| 2003/0215594 A1 | 11/2003 | Hamdar et al. | |
| 2004/0013865 A1 * | 1/2004 | Kotnis et al. | 428/304.4 |
| 2004/0062915 A1 | 4/2004 | Pabedinskas et al. | |
| 2004/0118078 A1 | 6/2004 | Rastegar | |
| 2004/0148965 A1 | 8/2004 | Hutchison et al. | |
| 2005/0067729 A1 * | 3/2005 | Laver et al. | 264/45.9 |
| 2005/0081475 A1 | 4/2005 | Edger et al. | |
| 2005/0163969 A1 | 7/2005 | Brown | |
| 2005/0239931 A1 | 10/2005 | Bolton et al. | |
| 2006/0032175 A1 | 2/2006 | Chen et al. | |

FOREIGN PATENT DOCUMENTS

| | | |
|---|---|---|
| EP | 1043355 A1 | 10/2000 |
| GB | 1418642 | 12/1975 |
| JP | 59-140034 | 8/1984 |
| JP | 2000-239466 | 5/2000 |
| RU | 2182578 | 5/2002 |
| RU | 2181081 | 10/2002 |
| SU | 1305051 | 4/1987 |
| WO | WO03059035 | 7/2003 |
| WO | WO2004099327 | 11/2004 |
| WO | WO2005044536 | 5/2005 |
| WO | WO2007016277 A1 | 2/2007 |

OTHER PUBLICATIONS

Jeanne Huber, "High-Tech Decks", Publisher: www.thisoldhouse.com.

Unknown, "Interfacing Wood-Plastic Composites Industries in the U.S.", Publisher: www.jobwerx.com.

Unknown, "Polyurethane Technical Information", Publisher: www.pipingtech.com.

Shastri, V.P. et al., "Macroporous polymer foams by hydrocarbon templating", Proceedings of the National Academy of Sciences of the United States of America, Feb. 28, 2000, pp. 1970-1975, vol. 97, No. 5, Publisher: The National Academy of Sciences of the United States of America.

* cited by examiner

METHOD OF PRODUCING COMPOSITE MEMBERS HAVING INCREASED STRENGTH

CROSS REFERENCE TO RELATED APPLICATION

This application is a Divisional of U.S. Utility patent application Ser. No. 11/507,358, titled, "METHOD OF PRODUCING COMPOSITE MEMBERS HAVING INCREASED STRENGTH," filed Aug. 21, 2006 now abandoned, which claims the benefit of U.S. Provisional Application No. 60/709,628, titled, "EXTRUDED COMPOSITE STRUCTURAL MATERIAL WITH INTEGRATED EXTRUDED FOAM CORE" filed Aug. 19, 2005, both of which are hereby incorporated by reference.

FIELD OF THE INVENTION

This invention relates generally to structures having structural core materials inside of a composite matrix. More particularly, the invention relates to extruded composite building materials having a selected core material tailored to increase the strength of the extruded member.

BACKGROUND OF THE INVENTION

An extrusion process is one of the most economic methods of manufacturing to produce engineering structural materials. Typically, an extrusion process is used to manufacture lengths of extruded members having a uniform cross-section. The cross-section of the members may be of various simple shapes such as circular, annular, or rectangular. The cross-section of the members may also be very complex, including internal support structures and/or having an irregular periphery.

Typically, an extrusion process utilizes thermoplastic polymer compounds that are introduced into a feed hopper. Thermoplastic polymer compounds can be in powder, liquid, cubed, pelletized and/or any other extrudable form. The thermoplastic polymer can be virgin, recycled, or a mixture of both. Furthermore, the thermoplastic material can be incorporated with a blowing agent(s) or mechanically injected gas during the extrusion process to make a cellular foam structure core.

A preferred material used to form the core is a rigid PVC powder compound that is easy to process, good impact strength, a high extrusion rate, good surface properties, good dimensional stability, and indentation resistance.

In addition, a preferred extrusion formulation may contain one or more processing aids. One example of a preferred processing aid is an acrylic based resin having a low molecular weight, such as Acryloid K-125 or K-175 from Rohm and Haas. Also, one or more lubricants may be used. An internal lubricant and an external lubricant may be provided. Preferred internal lubricants include metallic stearates such as calcium and zinc salts of stearic acid. Preferred external lubricants include paraffins.

Additionally, fillers may be added to the thermoplastic formulation to reduce product cost and to improve impact properties. Although many types of filler are compatible with the thermoplastic resin, a typical filler is calcium carbonate.

Examples of uses for extruded members include extruded composite building materials. Extruded composite building materials have been used in applications of house siding, architectural moldings, fencing, decking, and other applications. One drawback associated with existing extruded composite structural building materials is that existing materials lack the strength necessary to directly compete with or replace structural wood, e.g., various sized wood beams, i.e., 2×4, 2×6, 2×8, 4×4, 4×6, 4×8, etc. The environmental stability of composite materials, i.e., no dry rot, no termite, no warping, no splitting, etc., has resulted in increased popularity of composite decking and fencing materials. However, composite materials typically still require wood support structures for structural strength.

For example, composite lumber is currently used for decking, railing systems and playground equipment. Sources indicate that there currently exists a $300 million per year market for composite lumber in the United States. It is estimated that 80% of the current market uses a form of wood plastic composite (WPC). It is estimated that the other 30% is solid plastic. A wood plastic composite (WPC) refers to any composite that contains wood particles mixed with a thermaloset or thermoplastic. The WPC industry uses common wood species related to their region for the United States including pine, maple, oak and others. Particle sizes that are typically incorporated into WPC's range from 10 to 80% mesh. The presence of wood fiber increases the internal strength and mechanical properties of the composite as compared to, e.g., wood flower. WPC uses approximately 20% to 70% by mass wood to plastic ratios in a typical manufacturing process.

WPC's have desirable characteristics as compared to plastic systems. For example, the addition of wood fillers into plastic generally improves stiffness, reduces the coefficient of thermal expansion, reduces cost, helps to simulate the feel of real wood, produces a rough texture improving skid resistance, and allows WPC to be cut, shaped and fastened in a manner similar to wood.

The addition of wood particles to plastic also results in some undesirable characteristics. For example, wood particles may rot and are susceptible to fungal attack, wood particles can absorb moisture, wood particles are on the surface of a WPC member can be destroyed by freeze and thaw cycling, wood particles are susceptible to absorbing environmental staining, e.g., from tree leaves, wood particles can create pockets if improperly distributed in a WPC material, which may result in a failure risk that cannot be detected by visual inspection, and wood particles create manufacturing difficulties in maintaining consistent colors because of the variety of wood species color absorption is not consistent. Plastics use UV stabilizers that fade over time. As a result, the wood particles on the surface tend to undergo environmental bleaching. Consequently, repairing a deck is difficult due to color variation after 6 months to a year of sun exposure.

In a typical extrusion composite design, increased load bearing capacity capability may be increased while minimizing weight by incorporating internal support structures with internal foam cores. Examples of such designs are taught in U.S. Pat. Nos. 4,795,666; 5,728,330; 5,972,475; 6,226,944; and 6,233,892.

Increased load bearing capacity, stability and strength of non-extruded composites has been accomplished by locating geometrically shaped core material in between structural layers. Examples of pre-formed geometrically shaped core materials include hexagon sheet material and lightweight woods and foam. Problems associated with typical pre-formed core materials include difficulties associated with incorporating the materials into the extrusion process due to the pre-formed shape of the materials.

Other efforts to increase strength with composite fiber design have focused on fiber orientation in the composite to obtain increased strength to flex ratios. In a typical extrusion composite process, the fiber/fillers are randomly placed throughout the resin/plastic. Therefore increasing strength by fiber orientation is not applicable to an extrusion process.

Foam core material has been used in composites for composite material stiffening, e.g., in the marine industry, since the late 1930's and 1940's and in the aerospace industry since the incorporation of fiber reinforced plastics.

Recently, structural foam for core materials has greatly improved in strength and environmental stability. Structural core material strengths can be significantly improved by adding fibers. Polyurethane foams can be modified with chopped glass fibers to increase flexible yield strength from 8,900 psi-62,700 psi.

Prior art patents tend to describe foam core materials as rigid or having a high-density. However structural mechanical properties of the foam core tend not to be addressed. A common method to obtain a change in load capacity is to change the density of the material. For example, this can be done in a polyurethane in which water is being used as a blowing agent. The density of a polyurethane decreases with the increase in water concentration.

One problem that may occur when a core material and a structural material are not compatible both chemically and physically is delamination. Chemical and physical incompatibility can result in composite structures that suffer structural failures when the core material and the structural material separate from one another.

As discussed above, even though increasing load bearing capacity, stability and strength can be increased by engineering improvements with new resins/plastics, fibers/fillers and internal structural support members, load bearing capacity is still limited by the mechanics of the extrusion process. Despite the advantages associated with engineered building materials, i.e., elimination of problems associated with dry rot, termite, warping, splitting, etc., the failure of extruded composite structural materials to achieve the mechanical attributes of wood has detracted from the potential economic market value of engineered building materials.

Additionally, other applications, such as aerospace applications, utilize composite structures and have had to contend with problems associated with delamination of core materials and structural materials.

Therefore, it is desirable to bring structural core materials to the highest structural load bearing capability possible so that these technologies can be incorporated into extruded composites to replace wood load bearing structures and improve the composite industry as a whole by stabilizing the composite core to help improve composite core materials from delamination.

SUMMARY OF THE INVENTION

This invention relates to extruded composite materials, specifically focusing on increasing load bearing capacity and increasing the overall strength of composites. One aspect of the invention relates to tailoring a core material to have a desired coefficient of thermal expansion (CTE) with respect to the mechanical properties of the structural material.

One aspect of the invention is directed towards manufacturing processes that incorporate tailored core materials into an extruded structural member. In one embodiment, the invention relates to composite members that have an increased load bearing capacity and overall strength to allow the composite member to compete with wood for use in construction projects, e.g., planks and posts for use with household deck construction and in other projects. In another embodiment, the processes of the invention may be used to construct aerospace components having increased strength. Additional uses are also contemplated as falling within the scope of the invention.

One objective of the invention is to increase the load bearing capacity and strength of an extruded member by injecting a conformable core material, such as foam, into the extruded member. The invention contemplates an extrusion die that utilizes an injection system that may be incorporated into a manufacturer's existing extrusion equipment.

The conformable core material is injected into and around internal structural support members of an extruded member. Preferably, while the member is being extruded, the core material is injected to replace air voids within the member. The injection of conformable structural core material at the same time and same rate as the structural member is being extruded produces significant improvements by increasing load bearing capacity, stability and overall strength and by improving economic feasibility. For example, a rigid polyurethane foam is approximately 10 times less expensive per volume than PVC. Therefore, by replacing some interior volume of an extruded member with foam, the PVC volume is reduced while maintaining the same structural strength or greater. Therefore, the injection of a conformable foam results in a significant cost savings. In some applications, the injectable conformable structural core material may be applied to an extruded member that has been previously cured.

One benefit of an injectable conformable structural core material is that the core material is not limited by the structural design of the composite member because the core material conforms to the geometric shapes present in structure.

Although a core material and a structural material may be initially combined into a composite member without regard to the CTE's of each, this does not guarantee structural integrity over time. Therefore, the invention of the application involves tailoring of the conformable structural core material by the selection of optimal amounts of structural fillers to achieve a desired CTE of the materials. The step of tailoring the structural core material provides a solution for composite structural design regardless of the composition of the materials.

One aspect of the invention is directed towards the mechanical interaction and the relationship between a selected thermal plastic and a selected foam core material. Thermal plastics have mechanical properties that are influenced by environmental temperatures. For example, thermal plastics are stronger at colder temperatures but are more brittle. Thermal plastics are weaker in warmer weather, but are more flexible.

Foam for an internal core material inside a thermal plastic material may be tailored to overcome variations in structural strengths of thermal plastics. For example, an ideal core material is selected to possess thermal expansion properties that offset the thermal sag characteristics of thermal plastic structural material that the structural material experiences due to thermal heating in the environment. The thermal expansion of the core and mechanical stiffness of the composite may be tailored to achieve desired strength and internal pressure, resulting in mechanical stiffening of the composite.

The interaction of thermal sag of the thermal plastic material in relationship to the thermal expansion of the internal core material may be considered to select an ideal foam for use with a particular plastic. Ideally, the materials will function as a true composite. Because of the enormous uses of this invention associated with composite design and their applications with the overwhelming selection of materials and their combinations, the method described herein allows for optimal material pairings to be determined. As internal cross members of a structural member and the exterior structure undergo mechanical weakening as the temperature increases, a selected internal core material having an optimal thermal expansion with enhanced thermal mechanical properties will improve the rigidity and the mechanical strength of the combined composite in a manner similar to inflating an automobile tire to increase mechanical rigidity of the rubber.

A further advantage associated with the use of core materials such as foams are thermal insulation properties of the foam. A significant mechanical advantage is achieved by reducing the heat transfer rate from the surface of a structural member to an internal support structure of the composite, thereby thermally shielding the internal support structure from heat fluctuations and maintaining increased internal strengths of the cell structures in the composite during elevated temperatures.

CTE can be tailored in a composite matrix to improve surface functionality between the structural material and the core, thereby reducing the shear stresses that are created by thermal cycling at the contact interface of the two materials. Polyurethane foam densities are directly proportional to the blowing agent, typically water. The less water, the tighter the cell structure, which results in higher density foams.

In a closed cell structure, controlling internal forces caused by thermal cycling produced by the core material can be accomplished by tailoring the CTE. The CTE of a core material may be tailored by adjusting an amount of filler in the core material. For example, fillers such as chop fibers and micro spheres will have much lower CTE in the structural foam. The CTE of glass spheres is approximately 100 times smaller than most resin materials.

Glass spheres or ceramic spheres have enormous compression strength in comparison to the foam cells created by blowing agents. Therefore, the addition of micro spheres will not only provide the ability to tailor the CTE of the foam but it will replace low compression strength cell structures with higher strength cell structures.

The incorporation of chop fibers adds dramatic cross structural strength throughout the foam. Applicant's mechanical model analysis clearly illustrates an increased strength of materials resulting from the presence of core material regardless of the mechanical structure. The analysis was directed to extruded PVC. Some of the extruded PVC members were filled with chopped fibers and some were not. The chopped fibers increased strength of the structural member and decreased the CTE. The additives of selected fillers to the foam core materials illustrate similar characteristics. Selecting appropriate materials for a composite is complicated because composites are not homogeneous materials. However, composites are required to function as a homogeneous structure without structural deviation. The models clearly show how reinforcing fibers increases load bearing capabilities in the composite materials.

Man-made fibers and fillers can be used to improve mechanical properties as well as to lower CTE's of a core material. Ideally, filler materials should be environmentally stable and manipulatable into desired geometric configurations so that they may be incorporated into a structural design. Examples of fiber materials include fiberglass, carbon and nylon. These fibers can be cut to a specific length with a desired diameter that can be incorporated into an injection molding process either from the plastics manufacturer if the desired material is a foam plastic. If the resin is a reactive material such as polyurethane foam, the fillers and fibers can be combined either in the liquid stage prior to mixing the reactive components or in the foam mixing chamber prior to being extruded. The coefficient of thermal expansion is directly related to the volume fillers to plastics ratio.

Solid core materials can be made from high-density polyurethane, polyureas and epoxy materials etc., having high strength and fast cure times. These materials may be filled with fillers or micro spheres to produce high strength injectable core materials.

In one embodiment, the method of the invention is used to form composite planks for decking and construction purposes. The top surface of the plank may be treated or formed to have a textured finish such as a roughed, grooved, cross-hatched, striated, pitted, cracked, or wood grain texture. A mechanical embossing roller can be located behind the cooling calibrator and after the extrusion die to achieve surface texturing of the extruded core. Any variety of textures can be created by this method on the core such as wood grains and the like.

BRIEF DESCRIPTION OF THE DRAWINGS

FIG. 5a shows the extruded member with empty voids, while FIG. 5b shows the extruded member having voids filled with a conformable core material.

FIG. 6a shows the extruded member with empty voids, while FIG. 6b shows the extruded member having voids filled with a conformable core material.

FIG. 7a shows the extruded member with empty voids, while FIG. 7b shows the extruded member having voids filled with a conformable core material.

DESCRIPTION OF THE PREFERRED EMBODIMENTS

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

Figure 1:
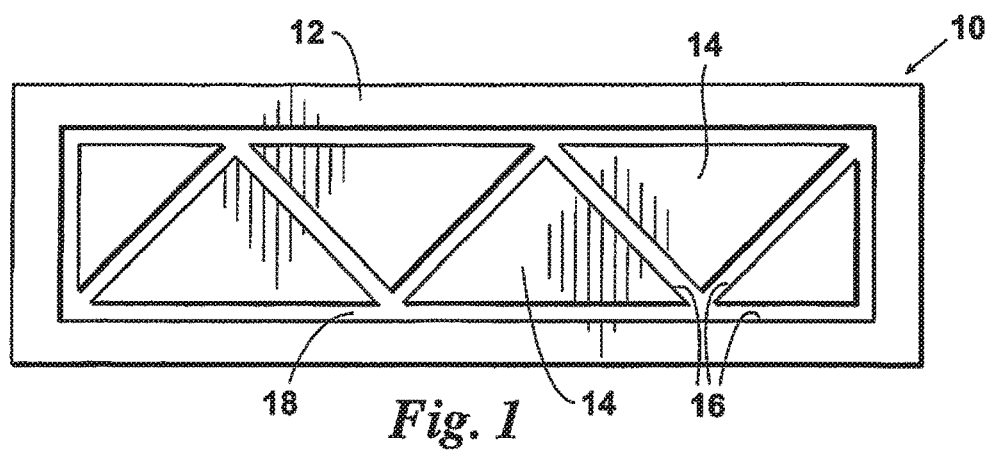
FIG. 1 is a cross-sectional view of a prior art extrusion die with internal support structures for added mechanical stability and strength.

Referring now to FIG. 1, a cross-section of prior art extrusion die 10 is shown. Extrusion die 10 includes external die element 12 and internal die elements 14 that define die walls 16. Die walls 16 define channels 18 through which a molten material is forced. Once the molten material is forced out of the die 10, the material cools, resulting in an extruded member, e.g., extruded member 19, shown in cross-section in FIG. 2.

Figure 3:
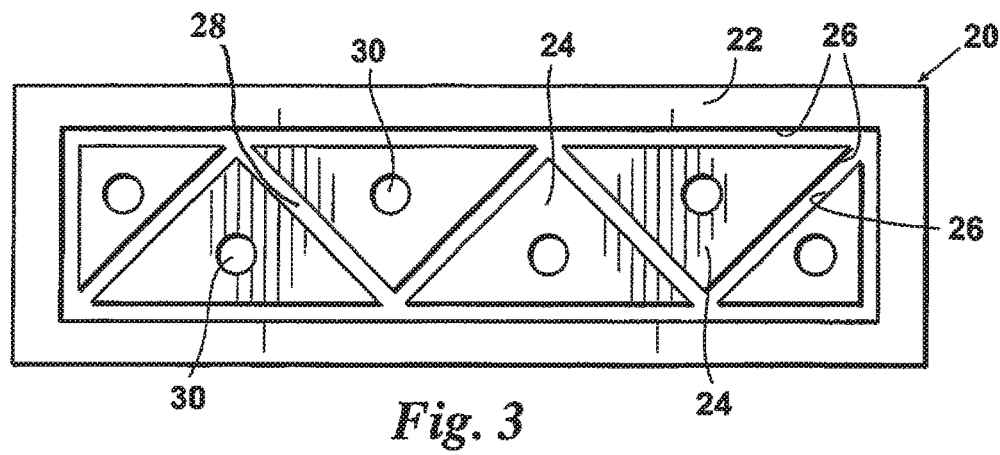
FIG. 3 is a cross-sectional view of an extrusion die having an injection system for filling void areas of an extruded member with a conformable core structural material.

Referring now to FIG. 3, an improved extrusion die 20 is shown. Extrusion die 20 includes external die element 22 and internal die elements 24 that define die walls 26. Die walls 26 define channels 28, through which material is forced. Injector paths 30 are provided in internal die elements 24 for facilitating the introduction of a core material, such as a foam or other material. Therefore, molten material is forced through channels 28 and out of die 20 while the extruded member is simultaneously filled with core material. The result is extruded member 32 (FIG. 4) having core material 34 located therein.

Figure 5A:
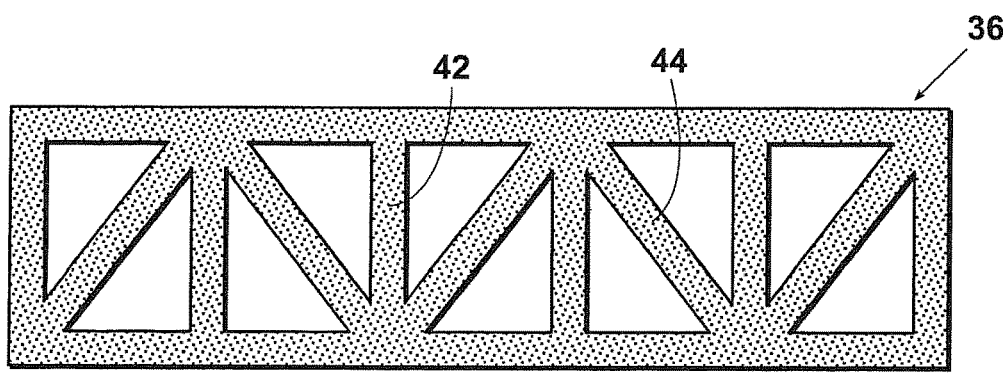
FIGS. 5a & 5b are cross-sectional views of extruded members having a configuration labeled "model 1".
Figure 5B:
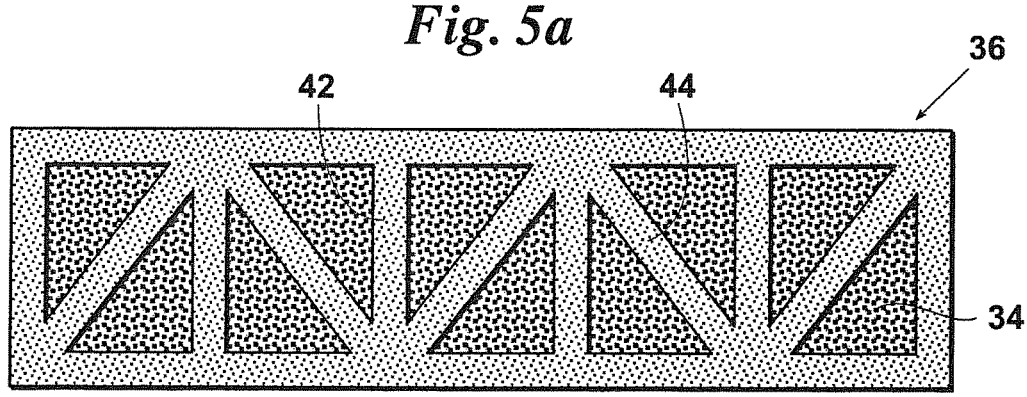
Figure 6A:
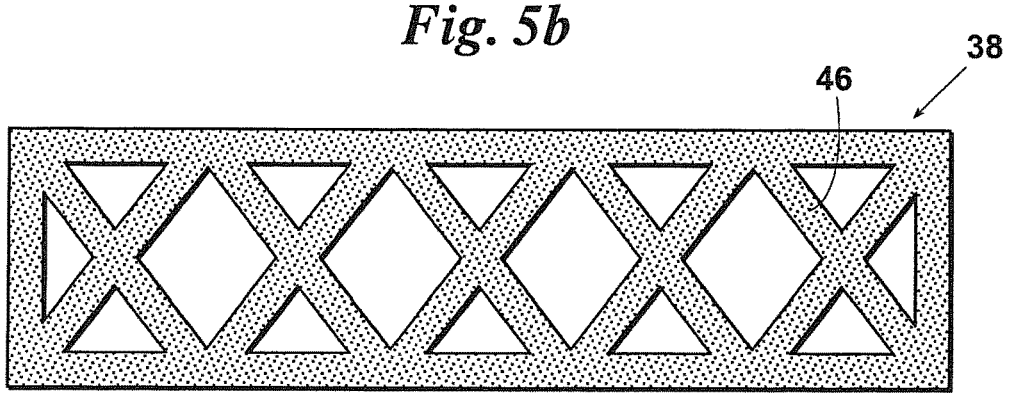
FIGS. 6a & 6b are cross-sectional views of extruded members having a configuration labeled "model 2".
Figure 6B:
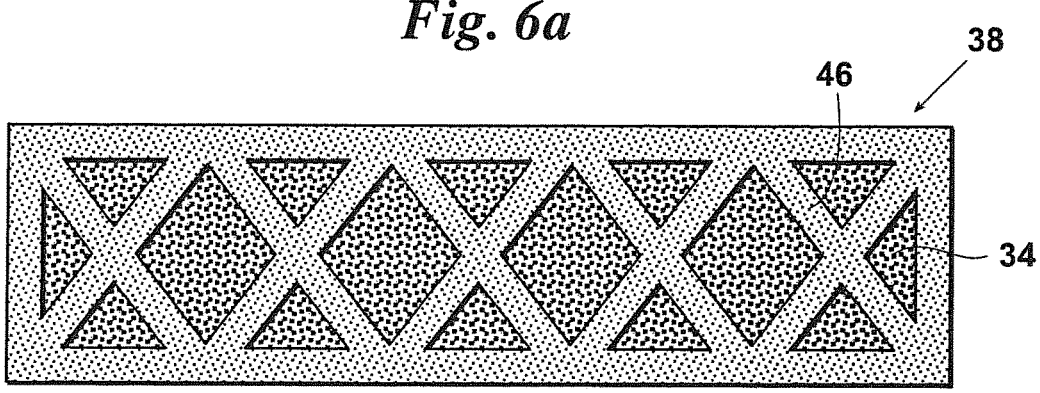
Figure 7A:
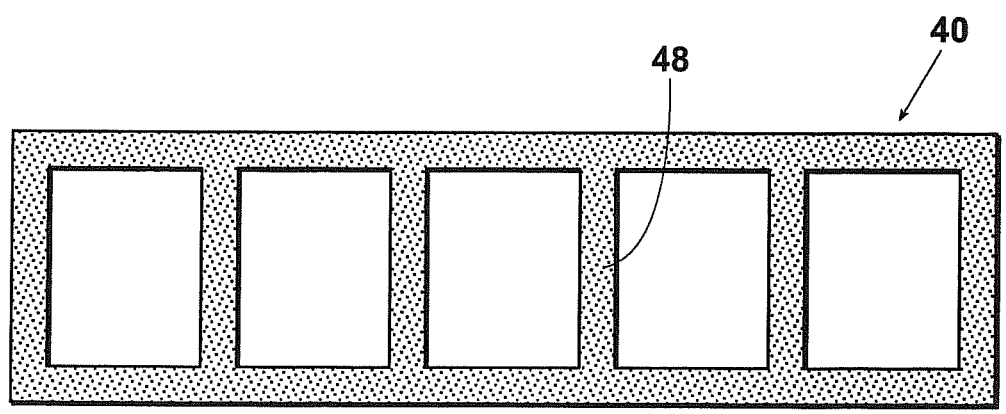
FIGS. 7a & 7b are cross-sectional views of extruded members having a configuration labeled "model 3".
Figure 7B:
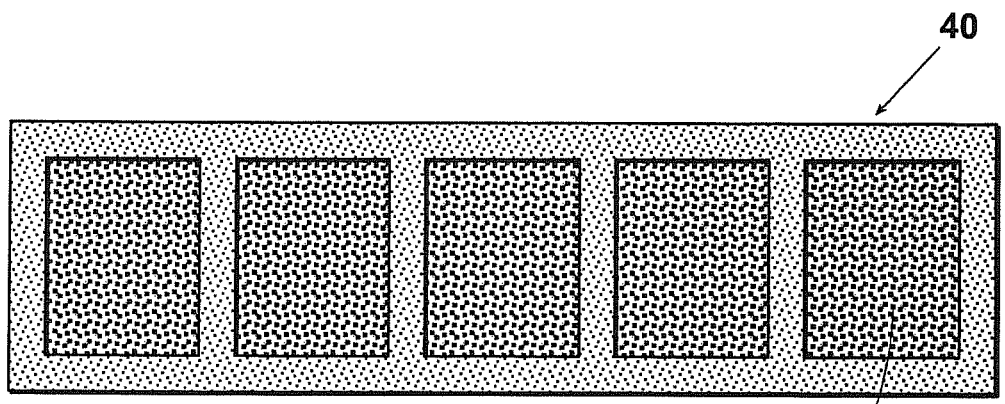

Referring now to FIGS. 5a-7b, composite members 36, 38, 40 and 42 are shown in FIGS. 5b, 6b and 7b with voids filled with core material 34. Composite members 36, 38, 40 and 42 may be extruded having various internal support configurations. For example, composite member 36 is shown with an internal structure having both vertical supports 42 and diagonal supports 44 wherein voids are filled with core material 34 (FIG. 5b). Composite member 38 is shown having diagonal supports 46 forming voids that are filled with core material 34 (FIG. 6b). Composite member 40 is shown having a plurality of vertical internal supports 48 filled with core material 34 (FIG. 7b). Other configurations are also possible.

Figure 9:
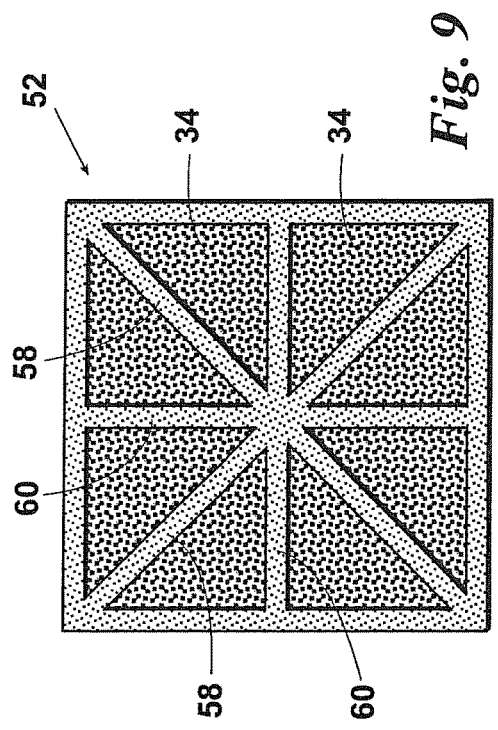
FIG. 9 is a cross-sectional view of an extruded member suitable for use as a support post, wherein the post has voids filled with a conformable core material.
Figure 11:
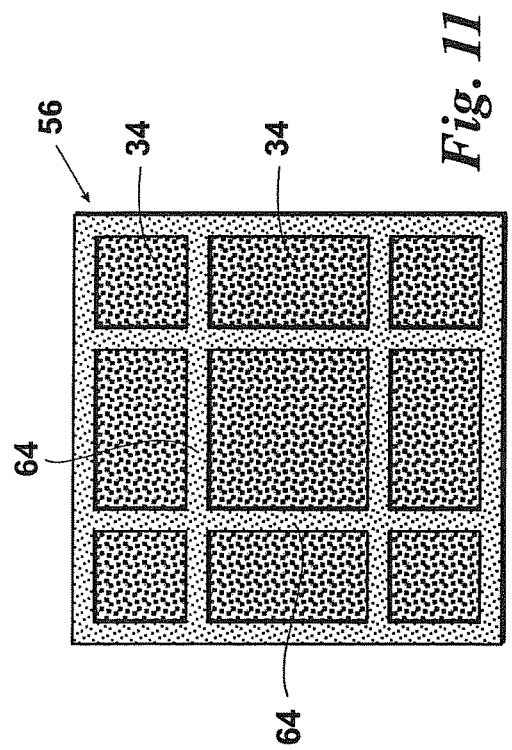
FIG. 11 is a cross-sectional view of an extruded member suitable for use as a support post, wherein the post has voids filled with a conformable core material.
Figure 8:
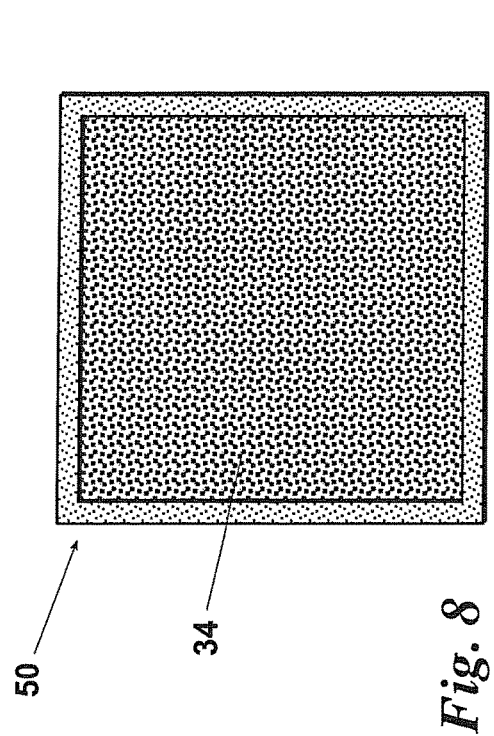
FIG. 8 is a cross-sectional view of an extruded member suitable for use as a support post, wherein the post has voids filled with a conformable core material.
Figure 10:
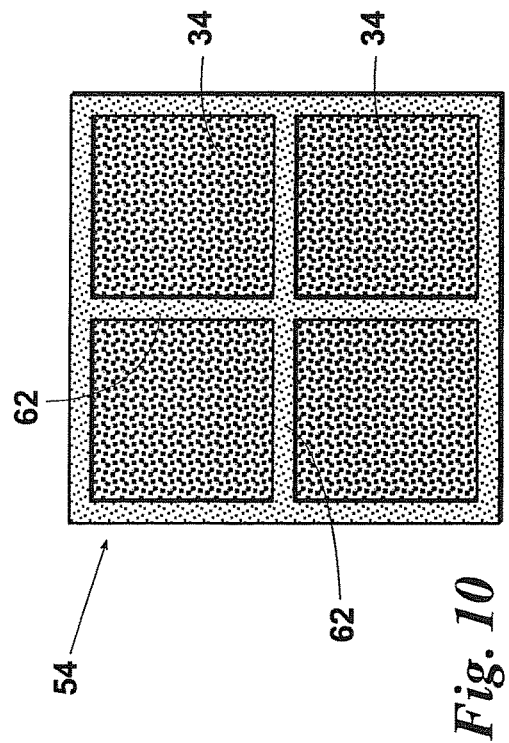
FIG. 10 is a cross-sectional view of an extruded member suitable for use as a support post, wherein the post has voids filled with a conformable core material.
Figure 12:
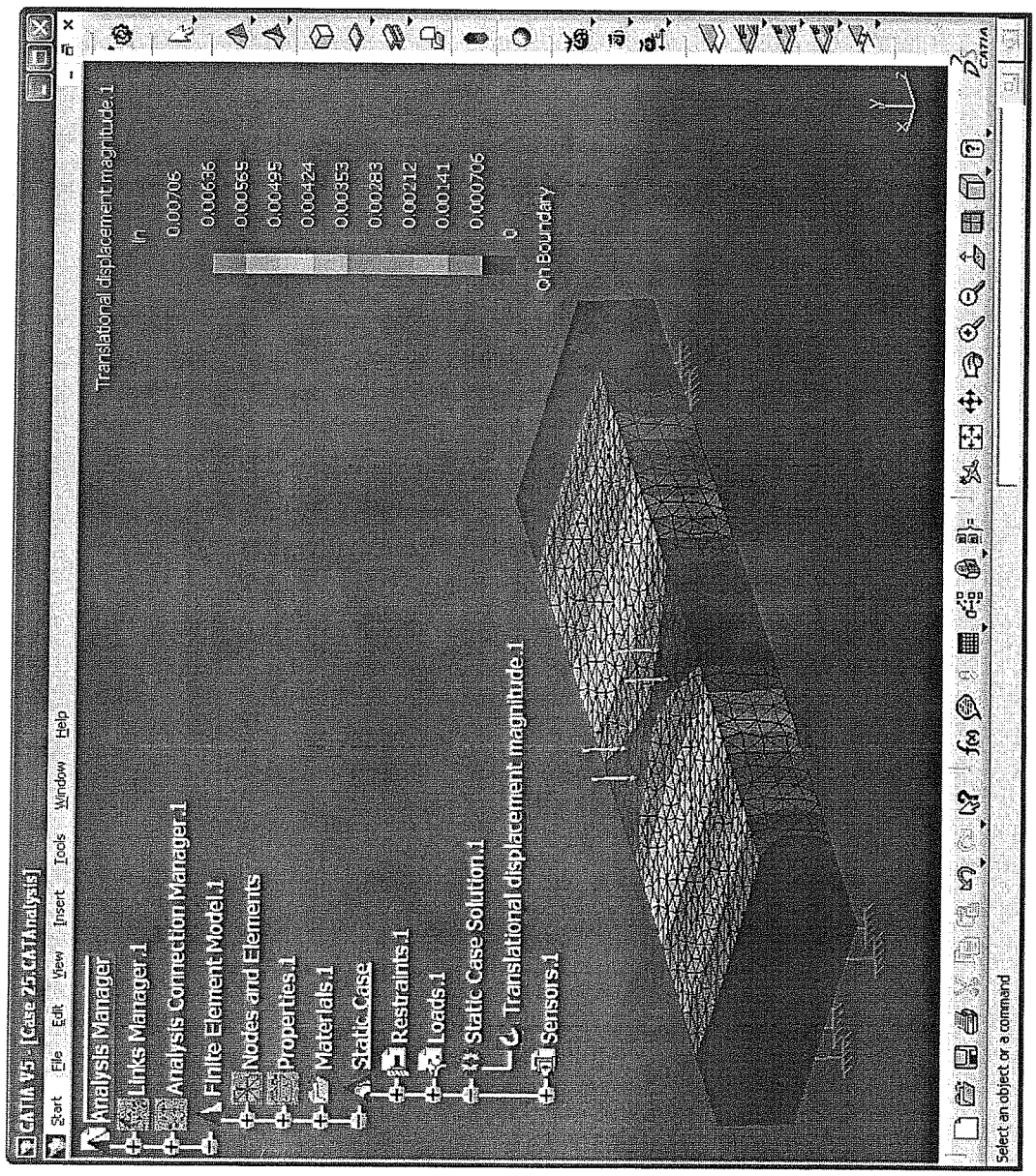
FIG. 12 is a stress analysis representation of the solid beam of FIG. 8.

As may be seen in FIGS. 8-11, composite structural beams 50, 52, 54 and 56 are shown having various internal support structures, wherein the beams are filled with core material 34. For example, beam 50 is shown with no internal supports and is filled with core material 34 (FIG. 8). Beam 52 is shown having diagonal supports 58 and right angled supports 60 and is filled with core material 34 (FIG. 9). Beam 54 is shown having a first and second right angled support 62, which define four equal sized voids filled with core material 34 (FIG. 10). Beam 56 is shown having four right angled supports 64, which define nine voids filled with core material 34 (FIG. 11). Other internal support configurations are possible.

Figure 2:
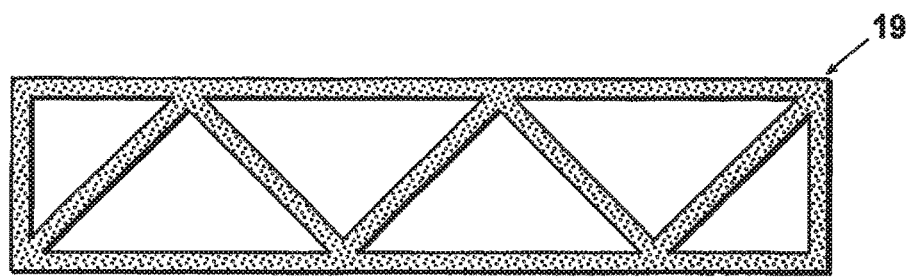
FIG. 2 is a cross-sectional view of an extruded member extruded from the die of FIG. 1.
Figure 4:
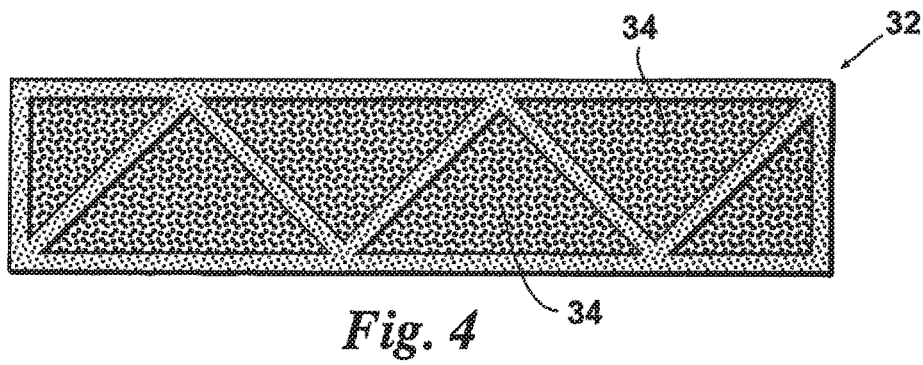
FIG. 4 is a cross-sectional view of an extruded member that has void areas filled by injectable conformable structural core material.

In one embodiment, e.g. the embodiment of FIGS. 2 and 4, injectable conformable structural core material 34 is fed into extrusion die 20 (FIG. 3) through injector paths 30 while structural material is forced through die 20. During an extrusion process, an optimal feed rate must be determined. As an example, the structural geometry of an extruded member is an exemplary square tube having dimensions of 1 inch by 1 inch and a wall thickness of 0.2 in. In a preferred extrusion process, the feed rate of injectable conformable structural core material is calculated to allow optimum performance without detrimentally increasing stress on the composite member. As an example, a rigid polyurethane foam or Styreenfoam may be used as the injectable conformable structural core material, i.e., a foam manufactured by Bayer, Baydur 726 IBS. Other materials may also be used as discussed below. To calculate the optimum feed rate, the following steps are followed.

Step 1 calculates the expansion rate of foam from liquid to solid. The following assumptions may be used with respect to foam properties:

$$1 \text{ g} = 4.0 \text{ cm}^3 \text{ approximately based on free rise density of the foam}$$

$$1 \text{ g} = (4.0 \text{ cm}^3 (1 \text{ in}^3/(2.45 \text{ cm})^3)) = 0.27 \text{ in}^3$$

Step 2 calculates the void volumes that are being filled per linear foot basis.

$$1 \text{ ft} = 12 \text{ in}$$

$$\text{Void Volume per foot} = (12 \text{ in})(1 \text{ in})(1 \text{ in}) = 12 \text{ in}^3$$

Step 3 calculates the extrusion rate per foot of the composite material. This calculation is based on equipment driven parameters. For purposes of this example the extrusion rate of the composite material is assumed to be 10 ft/min.

Step 4 determines the liquid injection rate of the unexpanded foam to match the extrusion rate of the composite. The expansion calculations in Step 1, the void volume calculation in Step 2 and the extrusion rate calculated in Step 3 are used in determining Step 4. The calculated liquid flow rate will allow the composite material to fill the structure completely without swelling resulting from volume expansion mismatch or creating voids in the internal structure. The expansion calculations in Step 1, the calculation in Step 2 and the extrusion rate in Step 3 allows the calculation of the liquid injection rate of the unexpanded foam to match the extrusion rate of the composite.

$$10 \text{ ft/min}(12 \text{ in}^3/1 \text{ ft})(1 \text{ g}/0.27 \text{ in}^3) = 444 \text{ g/min}$$

The calculated liquid flow rate of 444 g/min of unreacted foam material to fill 10 extruded board feet per minute allows the composite material to fill the structure completely without swelling resulting from volume expansion mismatch and without creating voids in the structural composite material. This example focused on the expansion characteristics of a foam without fiber and structural fillers because they do not change physical volume upon injection.

Most foams are two-part and are highly reactive. Therefore, mass flow controllers or volume flow controllers may be used in conjunction with the extruded material to control the injection system so that the process can be controlled or stopped at any time.

In one embodiment, the core material 34 is manually injected into structural voids or channels of an extruded member and excess core material 34 is trimmed off at the end of the process. If a closed structure is manually filled, there exists a possibility that the extruded member will be deformed by over expansion of injectable core material 34 inside the extruded member. While reactive materials like foam may be used as injectable conformable structural core material 34, non-active materials, such as gels, are also contemplated to fall within the scope of the invention.

Referring now to Tables 1-12, stress tests were conducted on extruded members of various structural materials and, various configurations, with and without a core material. The planks were supported with supports spaced 16 inches apart. The members each have outside dimensions of 5½ inches by 1½ inches. The internal structures and walls of the members have a wall thickness of 0.2 inches. The extruded members were secured with rigidly fixed ends and subjected to a test load of 500 lbf delivered by a 5½ inches long by 1½ wide inches member over the width of the plank centered between the supports.

Table 1 shows data for an extruded member for Model 1, i.e., an extruded member having both vertical and diagonal internal support members (see, FIGS. 5a, 5b). The structural material of the extruded member consists of PolyOne Duraflec LD800 Vinyl compound-Rigid (RPVC). In case 1, the member was tested with no core material present (see FIG. 5a). As can be seen from Table 1, the maximum deflection experienced by the member during testing was 0.0229 inches. In case 25, a member having identical construction but filled with a core material of Bayer material Science Baydure STR/C-405 IMR, Polyurethane Composite SRIM Foam, 45% Glass Filled experienced a deflection of only 0.00944. In case 45, a member having identical construction but filled with a core material of Bayer material Science Baydure STR/C-405 IMR, Polyurethane Composite SRIM Foam, 60% Glass Filled experienced a deflection of only 0.00706. Therefore, it can be seen that the foam filled structures exhibit an increased resistance to deflection, i.e., exhibit greater strength. Further, it can be seen that by increasing the glass fiber content, the amount of deflection decreases further, i.e., the strength of the member further increases. This trend may be observed for each of the geometric configurations of the extruded members, i.e., by reference to each of Tables 1-12. For certain materials and configurations, e.g., materials and configurations referenced by Tables 2 and 9, the performance increase by increasing the percentage of glass filler was negligible. It is believed that further increases in testing force would have brought out strength differences in the members having foams of 45% glass filled and 60% glass filled. This illustrates also where cost savings can be applied by decreasing the wall thickness of the PVC and increasing the void volume with foam.

In summary, Tables 1-12 illustrate that improved strength of a composite member may be achieved by incorporating fibers into the core material.

The interaction of thermal sag of the thermal plastic material in relationship to the thermal expansion of the internal core material may be considered to select an ideal foam for use with a particular plastic. As internal cross members of a structural member and the exterior structure undergo mechanical weakening as the temperature increases, a selected internal core material having an optimal coefficient of thermal expansion (CTE) with a high deflection temperature will improve the rigidity and the mechanical strength of the combined composite.

One method of controlling CTE is by adding structural fillers. For example, adding microspheres to be mixed with the foam. The addition of 40%-50% by volume glass microspheres will lower the weight of the core material and will decrease the CTE by approximately 40% to 50%. Glass microspheres have advantageous properties including the fact that the microspheres are rigidly solid, i.e., substantially incompressible, and have excellent adhesion inside a polyurethane matrix. Glass microspheres are chemically and thermally stable with near zero water absorption depending on the manufacture. Glass microsphere particle size allows excellent machining capability with smooth surfaces.

The addition of a selected amount of glass microspheres allows the resulting foam core to be tailored to have a desired CTE with respect to the CTE of the structural material. Examples of CTEs of known materials may be found in Table A, below.

TABLE A

| Category | CTE, linear 20° C. |
|---|---|
| PolyOne Duraflex LD800 Vinyl Compound - Rigid (RPVC) | 61.2 μm/m-° C. |
| Bayer | 90 μm/m-° C. |
| Generic Advantage | 5.8 μm/m-° C. |
| PolyOne Fiberloc 97510 Vinyl Compound - Rigid (RPVC), Glass Filled | 39.6 μm/m-° C. |
| PolyOne Fiberloc 97520 Vinyl Compound - Rigid (RPVC), Glass Filled | 30.6 μm/m-° C. |
| PolyOne Fiberloc 97530 Vinyl Compound - Rigid (RPVC), Glass Filled | |
| Bayer Material Science Baydur STR/C-400 BB, Polyurethane Composite SRIM Foam, 60% Glass Filled, MDI-based 2-Component Liquid System | 14 μm/m-° C. |
| Bayer Material Science Baydur STR/C-405 IMR, Polyurethane Composite SRIM Foam, 45% Glass Filled, MDI-based 2-Component Liquid System | 26 μm/m-° C. |
| North Wood Plastics HDPE with 20% Wood Fiber | |
| North Wood Plastics HDPE with 40% Wood Fiber | 58 μm/m-° C. |
| North Wood Plastics HDPE with 60% Wood Fiber | 36 μm/m-° C. |
| North Wood Plastics HDPE + UNIFILL 60% (20% Wood Fiber) | |
| North Wood Plastics HDPE + UNIFILL 60% (40% Wood Fiber) | |
| PolyOne Duraflec LD800 Vinyl Compound - Rigid (RPVC) | 61.2 μm/m-° C. |
| Bayer Material Science Baydur 726 IBS, Polyurethane Structural Foam RIM, Density 55 pcf, MDI-based 2-Component Liquid System | 90 μm/m-° C. |
| Generic Advantex Glass Fiber | 5.8 μm/m-° C. |

In the below example, structural fillers are used to reduce the CTE and the density of a composite core material. Table B, below, shows microsphere foam ratios and the CTE of the foam material at different microsphere concentrations.

TABLE B

|  | 20% filled | 30% filled | 40% filled | 50% filled | Particle Size/ microns | Isostatic Crush Strength |
|---|---|---|---|---|---|---|
| CTE um/mC. | 73 | 64 | 55.5 | 47 | | |
| K1 | 0.728 | 0.625 | 0.576 | 0.5 | 120μ | 250 psi |
| K15 | 0.734 | 0.661 | 0.588 | 0.515 | 115μ | 300 psi |
| K20 | 0.744 | 0.676 | 0.608 | 0.54 | 120μ | 500 psi |
| K25 | 0.754 | 0.691 | 0.628 | 0.565 | 105μ | 750 psi |
| K37 | 0.778 | 0.723 | 0.676 | 0.625 | 85μ | 3,000 psi |
| K46 | 0.796 | 0.754 | 0.712 | 0.67 | 80μ | 6,000 psi |

The CTE of a known PVC material, e.g., PolyOne Duraflec® LD800 Vinyl Compound—Rigid (RPVC) is known to be 61.2 μm/m-° C. according to ASTM D696 (from Table A, above). Table B, immediately above, shows properties of a particular example foam, i.e., Bayer Bayder 7261BS Rigid Polyeurathane Foam having a starting reference of a density of 0.88 g/cc prior to structural fillers being added and has a CTE of 90 μm/m-° C. By tailoring the amount of structural fillers, in this case 3M Scotchlite Glass Bubbles K Series having a CTE of 3.3 μm/m-° C., a selected amount of structural filler can be incorporated into the foam to create a resulting foam wherein the CTE of the PVC structural material and the CTE of the foam core may be optimized. In this example, the amount of filler required to optimize CTEs is between 30% or 40% filled. In this example, a 40% fill using K20 microspheres results in a foam CTE of 55.5 μm/m-° C. The new combined density is 0.608 g/cc.

Although the above example shows how the CTE of the structural material and the foam core may be selected to reduce CTE differences, it is contemplated that any desired relationship of the CTE of the structural material and the foam core may be selected to achieve a desired result.

Figure 13:
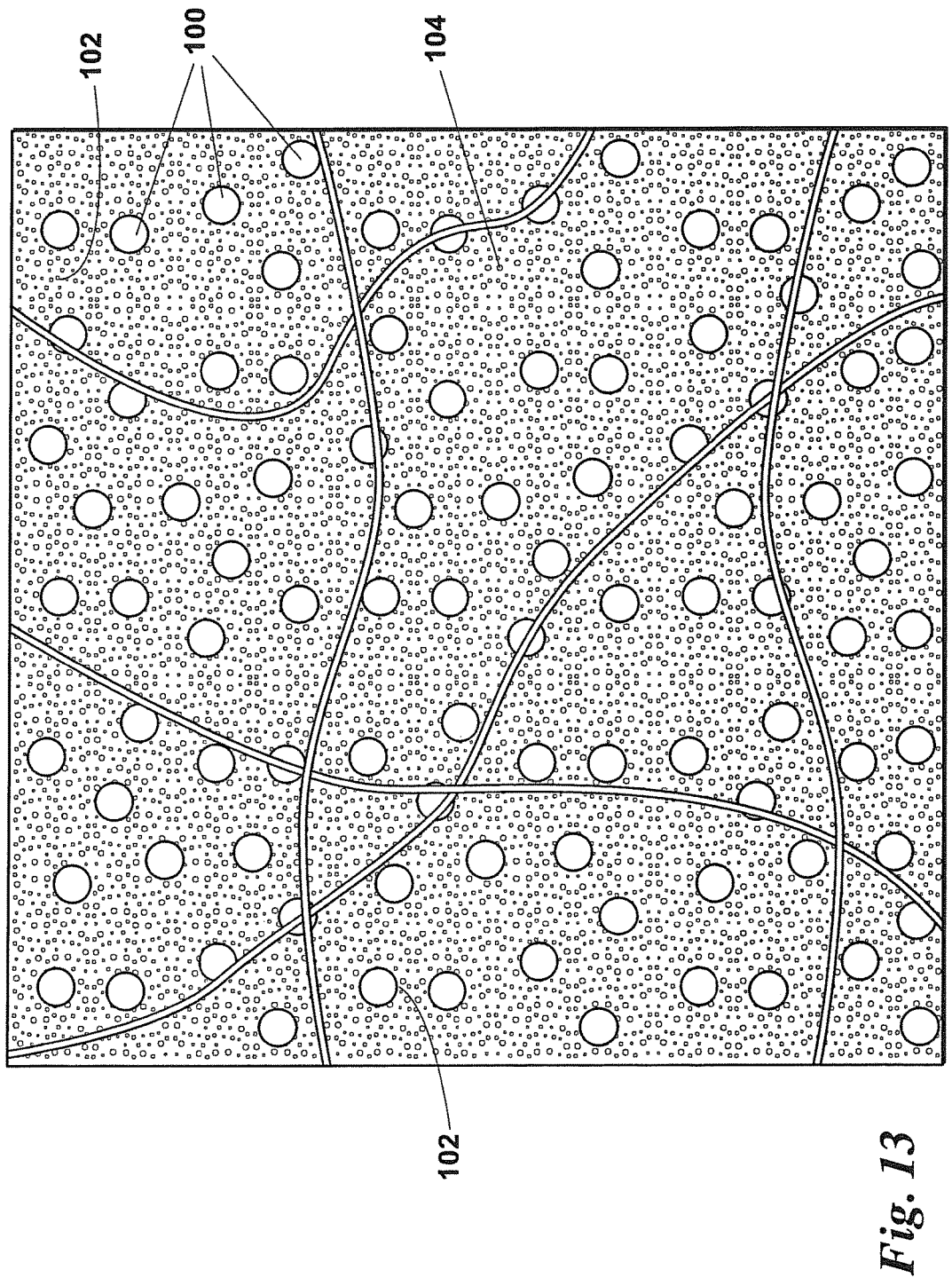
FIG. 13 is a cross-sectional view of a structural core material with the presence of fiber interaction throughout a microsphere foam matrix.

Referring now to FIG. 13, shown are microspheres 100 combined with chopped fibers 102 to allow new innovations and further enhance structural stability within composite foam 104. Cellular foam structure 104 of polyurethane can be tailored by varying the blowing agent. The influence of solid fillers, such as microspheres 100, combined with the presence of fibers 102 will greatly strengthen the overall composite. For example, an ⅛ inch chopped fiber 102 having a diameter of 7 microns may be located inside of foam 104 having a volume ratio of 50% microspheres 100 and 50% foam 104 by volume. The fiber 102 will contact and adhere to the microspheres 100. The largest microsphere 100 that 3M® makes is 120 microns. The ⅛ inch fiber 102 inside of the 50% solid foam matrix would therefore have a possibility of contacting and adhering to the surface of 5,200 microspheres 100. The foam material 104 has elastomeric properties and the solid particles 100 do not. Therefore, solid particles 100 will act like an anchoring system with a fiber 102 in the foam matrix, which will limit the degree of freedom that the fiber 102 has to move inside the resin matrix. This phenomenon reduces the amount of fibers 102 necessary to increase the stiffness because of the anchoring nature of the solid material 100 interacting with the fibers 102 inside the micron structural geometry.

Utilizing the above described method, it can be seen that structural foams may be tailored to meet the needs of the aerospace industry. Generally, the criteria for aerospace structural foam composites include thermal stability and low CTE, low density and lightweight (10 to 15 lbs./ft³), structural rigidity, good internal strength, operating temperatures above 170° F., machineable, closed cell, low water absorption, controllable cure time, chemically stable, excellent adhesion for epoxies, and materials that can be cast molded to any length.

When designing structural core materials for aerospace, the microspheres will need to be added at a high percentage rate, e.g., 40%-80% by volume in order to lower the CTE and the overall density of the structural core material.

Fiber additives may be incorporated into this design application in small amounts if necessary to increase mechanical dimensional stability throughout the core material. The drawback of adding fiber is that the addition of fiber increases the weight of the composite member. Therefore, small amounts of appropriately selected chopped fibers may be used, i.e., from 4% to 10% by mass, as a starting point, should be sufficient, to achieve desired structural performance. Short chopped glass fibers with a small diameter in the micron range provide benefits of low moisture absorption with chemical, mechanical, and thermally stability. Further, the resulting composite is machinable, and chopped glass fibers provide excellent adhesion with urethanes.

The above described methods may be used to produce composite lumber having desirable attributes. Composite lumber utilizing the methods of the invention may be produced having excellent thermal mechanical stability up to or higher then 170° F., low moisture absorption, cost savings reducing structural materials, a controllable cure time to maximize production, fire retardant properties, insect resistant properties, fungal resistant properties, and that cut easily with a circular saw.

Polyurethane structural foam is the most cost-efficient foam matrix currently available. Polyurethane foam can be formulated to be fire, insect and fungal resistant based on additives which have been proven successful. Depending on the selection of extruded structural chemical materials and whether the foam is filled or unfilled significantly changes the structural integrity of the core material. However, PVC materials rather than polyethylene or polypropylene are preferred because of the superior mechanical and thermal properties.

Structural additives may be utilized for cost savings. Natural fibers as well as chopped glass fibers may be used because PVC is moisture resistant, which protects the natural fibers from degradation. A higher percentage of fibers will result in a higher structural stiffness. 30% to 50% by weight with a ratio of 50% hemp fiber and 50% glass is preferred. Glass fibers are more thermally stable but natural fibers are more cost-efficient. By using the above listed high fiber ratios, increased amounts of blowing agents may be used, which will lower the density of the foam without sacrificing structural integrity. Small amounts of solid particles such as glass microspheres or fumed silica can also be added to tailor the CTE. This tailoring will allow the materials to function homogeneously promoting the best mechanical thermal stability between composite components.

In the case of foam plastics the same structural enhancement previously mentioned can be used. The introduction of the structural fillers and fibers can be introduced in the thermo plastic material prior to the extrusion from the raw material supplier or in the compounding step before contact with a blowing agent(s) or mechanically injected gas. In the case of mechanically injected gases, the structural fillers and fibers can be incorporated into the plastic through the introduction of the pressurized gas, which contains the appropriate mixture ration of the structural particles and fibers.

Plastics may also incorporate UV stabilizers. UV stabilizers tend to decreased with time. UV stabilizer may be incorporated into the plastic as an additive throughout the entire thickness of the plastic. In use, UV attack typically comes from sunlight. Therefore, the plastic composite needs a protective UV coating rather than internal UV stability.

A non-skid surface with excellent abrasion resistance and a UV coating that does not lose UV stability with time would be a benefit to the above described composite system, particularly when employed in a method to create composite wood planks for use in household decking. The non-skid coating may be made by adding fillers such as sand, micro spheres or other small hard particles. These particles will be added to different areas of the manufacturing processes. The first application will apply a dust coating prior to an embossing wheel thereby embedding small particles into the surface of the composite. The excess material may then be vacuumed off the surface and recycled. A spray applied sealant with a UV additive as well as an abrasion resistant particle may then be applied. This coating will have the appearance of a translucent stain giving the embossed wood grain a natural stain look of wood. An embossing tool is deployed to leave grooves similar to wood grain characteristics, which makes the coating thicker and darker in the wood grain pattern to simulate the appearance of real wood. Selecting the appropriate coating system with the appropriate pigment level can help seal the wood particles into the composite as well as even out inconsistent color variations of WPC. The plastic will still need a basic pigment additive so that if the coating were scratched or damage there will not be a drastic color difference. It is also possible to provide a scratch repair system for the consumer to match their aesthetic grain pattern when a scratch is sealed. There are a variety of coatings that can be used. For example, polyurethanes, polyureas, and acrylics with a variety of curing possibilities, such as room temperature, heat and catalized.

The composite industry has developed a variety of materials that can be used to create structural materials having desired properties. It is anticipated that the foam industry may produce foams that have strengths greater than wood itself that can be enhanced by the use of the methods of the invention for reinforcing foam materials. FIG. 9 illustrates that a durable outward shell may be required or the foam may have a durable self-skinning process in which the foam creates its own durable outer shell upon curing.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

TABLE 1

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 1 | Model 1 | | PolyOne Duraflec LD800 Vinyl Compound-Rigid (RPVC) | 2.70E+09 | 0.38 | 1390 | 4.36E+07 | 0.00006 | 4.813 |
| 45 | Model 1 | | PolyOne Duraflec LD800 Vinyl Compound-Rigid (RPVC) | 2.70E+09 | 0.38 | 1390 | 4.36E+07 | 0.00006 | 4.813 |
| 25 | Model 1 | | PolyOne Duraltec LD800 Vinyl Compound-Rigid (RPVC) | 2.70E+09 | 0.38 | 1390 | 4.36E+07 | 0.00006 | 4.813 |

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 1 | none | 0 | 0 | 0 | 0 | 0 | 0 | 0.0229 |
| 45 | Bayer Material Science Baydur STR/C-405 IMR, Poryurethane Composite SRIM Foam, 45% Glass Filled | 8.30E+09 | 0.35 | 1590 | 1.03E+08 | 0.00003 | 3.437 | 0.00944 |
| 25 | Bayer Material Science Baydur STR/C-400 BB, Poryurethane Composite SRIM Foam, 60% Glass Filled | 1.50E+10 | 0.35 | 1710 | 2.21E+08 | 0.00001 | 3.437 | 0.00706 |

TABLE 2

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 2 | Model 1 | | PolyOne Fiberloc 97510 Vinyl Compound-Rigid (RPVC), Glass Filled | 5.01E+09 | 0.38 | 1480 | 5.45E+07 | 0.00004 | 4.813 |
| 14 | Model 1 | | PolyOne Fiberloc 97510 Vinyl Compound-Rigid (RPVC), Glass Filled | 5.01E+09 | 0.38 | 1480 | 5.45E+07 | 0.00004 | 4.813 |
| 26 | Model 1 | | PolyOne Fiberloc 97510 Vinyl Compound-Rigid (RPVC), Glass Filled | 5.01E+09 | 0.38 | 1480 | 5.45E+07 | 0.00004 | 4.813 |

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 2 | none | 0 | 0 | 0 | 0 | 0 | 0 | 0.0123 |
| 14 | Bayer Material Science Baydur STR/C-405 IMR, Polyurethane Composite SRIM Foam, 45% Glass Filled | 8.30E+09 | 0.35 | 1590 | 1.03E+08 | 0.00003 | 3.437 | 0.0051 |
| 26 | Bayer Materials Science Baydur STR/C-400 BB, Polyurethane Composite SRIM Foam, 60% Glass Filled | 1.50E+10 | 0.35 | 1710 | 2.21E+08 | 0.00001 | 3.437 | 0.00515 |

TABLE 3

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 3 | Model 1 | | PolyOne Fiberloc 97520 Vinyl Compound-Rigid (RPVC), Glass Filled | 7.03E+09 | 0.38 | 1550 | 6.03E+07 | 0.00003 | 4.813 |
| 15 | Model 1 | | PolyOne Fiberloc 97520 Vinyl Compound-Rigid (RPVC), Glass Filled | 7.03E+09 | 0.38 | 1550 | 6.03E+07 | 0.00003 | 4.813 |
| 27 | Model 1 | | PolyOne Fiberloc 97520 Vinyl Compound-Rigid (RPVC), Glass Filled | 7.03E+09 | 0.38 | 1550 | 6.03E+07 | 0.00003 | 4.813 |

TABLE 3-continued

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 3 | none | 0 | 0 | 0 | 0 | 0 | 0 | 0.00878 |
| 15 | Bayer Material Science Baydur STR/C-405 IMR, Polyurethane Composite SRIM Foam, 45% Glass Filled | 8.30E+09 | 0.35 | 1590 | 1.03E+08 | 0.00003 | 3.437 | 0.00518 |
| 27 | Bayer Material Science Baydur STR/C-400 BB, Polyurethane Composite SRIM Foam, 60% Glass Filled | 1.50E+10 | 0.35 | 1710 | 2.21E+08 | 0.00001 | 3.437 | 0.00422 |

TABLE 4

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 4 | Model 1 | | PolyOne Fiberloc 97530 Vinyl Compound-Rigid (RPVC), Glass Filled | 7.76E+09 | 0.38 | 1620 | 6.26E+07 | 0.00003 | 4.813 |
| 16 | Model 1 | | PolyOne Fiberloc 97530 Vinyl Compound-Rigid (RPVC), Glass Filled | 7.76E+09 | 0.38 | 1620 | 6.26E+07 | 0.00003 | 4.813 |
| 28 | Model 1 | | PolyOne Fiberloc 97530 Vinyl Compound-Rigid (RPVC), Glass Filled | 7.76E+09 | 0.38 | 1620 | 6.26E+07 | 0.00003 | 4.813 |

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 4 | none | 0 | 0 | 0 | 0 | 0 | 0 | 0.00796 |
| 16 | Bayer Material Science Baydur STR/C-405 IMR, Polyurethane Composite SRIM Foam, 45% Glass Filled | 8.30E+09 | 0.35 | 1590 | 1.03E+08 | 0.00003 | 3.437 | 0.00483 |
| 28 | Bayer Material Science Baydur STR/C-400 BB, Polyurethane Composite SRIM Foam, 60% Glass Filled | 1.50E+10 | 0.35 | 1710 | 2.21E+08 | 0.00001 | 3.437 | 0.00397 |

TABLE 5

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 5 | Model 2 | | PolyOne Duraflec LD800 Vinyl Compound-Rigid (RPVC) | 2.70E+09 | 0.38 | 1390 | 4.36E+07 | 0.00006 | 5.178 |
| 17 | Model 2 | | PolyOne Duraflec LD800 Vinyl Compound-Rigid (RPVC) | 2.70E+09 | 0.38 | 1390 | 4.36E+07 | 0.00006 | 5.178 |
| 29 | Model 2 | | PolyOne Duraflex LD800 Vinyl Compound-Rigid (RPVC) | 2.70E+09 | 0.38 | 1390 | 4.36E+07 | 0.00006 | 5.178 |

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 5 | none | 0 | 0 | 0 | 0 | 0 | 0 | 0.0216 |
| 17 | Bayer Material Science Baydur STR/C-405 IMR, Polyurethane Composite SRIM Foam, 45% Glass Filled | 8.30E+09 | 0.35 | 1590 | 1.03E+08 | 0.00003 | 3.072 | 0.01 |
| 29 | Bayer Material Science Baydur STR/C-400 BB, Polyurethane Composite SRIM Foam, 60% Glass Filled | 1.50E+10 | 0.35 | 1710 | 2.21E+08 | 0.00001 | 3.072 | 0.00775 |

TABLE 6

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 6 | Model 2 | | PolyOne Fiberloc 97510 Vinyl Compound-Rigid (RPVC), Glass Filled | 5.01E+09 | 0.38 | 1480 | 5.45E+07 | 0.00004 | 5.178 |
| 18 | Model 2 | | PolyOne Fiberloc 97510 Vinyl Compound-Rigid (RPVC), Glass Filled | 5.01E+09 | 0.38 | 1480 | 5.45E+07 | 0.00004 | 5.178 |
| 30 | Model 2 | | PolyOne Fiberloc 97510 Vinyl Compound-Rigid (RPVC), Glass Filled | 5.01E+09 | 0.38 | 1480 | 5.45E+07 | 0.0004 | 5.178 |

TABLE 6-continued

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 6 | none | 0 | 0 | 0 | 0 | 0 | 0 | 0.0117 |
| 18 | Bayer Material Science Baydur STR/C-405 IMR, Poryurethane Composite SRIM Foam, 45% Glass Filled | 8.30E+09 | 0.35 | 1590 | 1.03E+08 | 0.00003 | 3.072 | 0.00666 |
| 30 | Bayer Material Science Baydur STR/C-400 BB, Poryurethane Composite SRIM Foam, 60% Glass Filled | 1.50E+10 | 0.35 | 1710 | 2.21E+08 | 0.00001 | 3.072 | 0.00545 |

TABLE 7

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 7 | Model 2 | | PolyOne Fiberloc 97520 Vinyl Compound-Rigid (RPVC), Glass Filled | 7.03E+09 | 0.38 | 1550 | 6.03E+07 | 0.00003 | 5.178 |
| 19 | Model 2 | | PolyOne Fiberloc 97520 Vinyl Compound-Rigid (RPVC), Glass Filled | 7.03E+09 | 0.38 | 1550 | 6.03E+07 | 0.00003 | 5.178 |
| 31 | Model 2 | | PolyOne Fiberloc 97520 Vinyl Compound-Rigid (RPVC), Glass Filled | 7.03E+09 | 0.38 | 1550 | 6.03E+07 | 0.00003 | 5.178 |

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 7 | none | 0 | 0 | 0 | 0 | 0 | 0 | 0.00831 |
| 19 | Bayer Material Science Baydur STR/C-405 IMR, Polyurethane Composite SRIM Foam, 45% Glass Filled | 8.30E+09 | 0.35 | 1590 | 1.03E+08 | 0.00003 | 3.072 | 0.00521 |
| 31 | Bayer Material Science Baydur STR/C-400 BB, Polyurethane Composite SRIM Foam, 60% Glass Filled | 1.50E+10 | 0.35 | 1710 | 2.21E+08 | 0.00001 | 3.072 | 0.00438 |

TABLE 8

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 8 | Model 2 | | PolyOne Fiberloc 97530 Vinyl Compound-Rigid (RPVC), Glass Filled | 7.76E+09 | 0.38 | 1620 | 6.26E+07 | 0.00003 | 5.178 |
| 20 | Model 2 | | PolyOne Fiberloc 97530 Vinyl Compound-Rigid (RPVC), Glass Filled | 7.76E+09 | 0.38 | 1620 | 6.26E+07 | 0.00003 | 5.178 |
| 36 | Model 2 | | PolyOne Fiberloc 97530 Vinyl Compound-Rigid (RPVC), Glass Filled | 7.76E+09 | 0.38 | 1620 | 6.26E+07 | 0.00003 | 3.52 |

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 8 | none | 0 | 0 | 0 | 0 | 0 | 0 | 0.00753 |
| 20 | Bayer Material Science Baydur STR/C-405 IMR, Polyurethane Composite SRIM Foam, 45% Glass Filled | 8.30E+09 | 0.35 | 1590 | 1.03E+08 | 0.00003 | 3.072 | 0.00484 |
| 36 | Bayer Material Science Baydur STR/C-400 BB, Polyurethane Composite SRIM Foam, 60% Glass Filled | 1.50E+10 | 0.35 | 1710 | 2.21E+08 | 0.00001 | 4.73 | 0.00371 |

TABLE 9

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 9 | Model 3 | | PolyOne Duraflec LD800 Vinyl Compound-Rigid (RPVC) | 2.70E+09 | 0.38 | 1390 | 4.36E+07 | 0.00006 | 3.52 |
| 21 | Model 3 | | PolyOne Duraflec LD800 Vinyl Compound-Rigid (RPVC) | 2.70E+09 | 0.38 | 1390 | 4.36E+07 | 0.00006 | 3.52 |
| 33 | Model 3 | | PolyOne Duraflec LD800 Vinyl Compound-Rigid (RPVC) | 2.70E+09 | 0.38 | 1390 | 4.36E+07 | 0.00006 | 3.52 |

TABLE 9-continued

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 9 | none | 0 | 0 | 0 | 0 | 0 | 0 | 0.0287 |
| 21 | Bayer Material Science Baydur STR/C-400 BB, Polyurethane Composite SRIM Foam, 45% Glass Filled | 1.50E+10 | 0.35 | 1710 | 2.21E+08 | 0.00001 | 4.73 | 0.00585 |
| 33 | Bayer Material Science Baydur STR/C-400 BB, Polyurethane Composite SRIM Foam, 60% Glass Filled | 1.50E+10 | 0.35 | 1710 | 2.21E+08 | 0.00001 | 4.73 | 0.00585 |

TABLE 10

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 10 | Model 3 | | PolyOne Fiberloc 97510 Vinyl Compound-Rigid (RPVC), Glass Filled | 5.01E+09 | 0.38 | 1480 | 5.45E+07 | 0.00004 | 3.52 |
| 22 | Model 3 | | PolyOne Fiberloc 97510 Vinyl Compound-Rigid (RPVC), Glass Filled | 5.01E+09 | 0.38 | 1480 | 5.45E+07 | 0.00004 | 3.52 |
| 34 | Model 3 | | PolyOne Fiberloc 97510 Vinyl Compound-Rigid (RPVC), Glass Filled | 5.01E+09 | 0.38 | 1480 | 5.45E+07 | 0.00004 | 3.52 |

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 10 | none | 0 | 0 | 0 | 0 | 0 | 0 | 0.0155 |
| 22 | Bayer Material Science Baydur STR/C-405 IMR, Polyurethane Composite SRIM Foam, 45% Glass Filled | 8.30E+09 | 0.35 | 1590 | 1.03E+08 | 0.00003 | 4.73 | 0.00618 |
| 34 | Bayer Material Science Baydur STR/C-400 BB, Polyurethane Composite SRIM Foam, 60% Glass Filled | 1.50E+10 | 0.35 | 1710 | 2.21E+08 | 0.00001 | 4.73 | 0.00458 |

TABLE 11

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 11 | Model 3 | | PolyOne Fiberloc 97520 Vinyl Compound-Rigid (RPVC), Glass Filled | 7.03E+09 | 0.38 | 1550 | 6.03E+07 | 0.00003 | 3.52 |
| 23 | Model 3 | | PolyOne Fiberloc 97520 Vinyl Compound-Rigid (RPVC), Glass Filled | 7.03E+09 | 0.38 | 1550 | 6.03E+07 | 0.00003 | 3.52 |
| 35 | Model 3 | | PolyOne Fiberloc 97520 Vinyl Compound-Rigid (RPVC), Glass Filled | 7.03E+09 | 0.38 | 1550 | 6.03E+07 | 0.00003 | 3.52 |

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 11 | none | 0 | 0 | 0 | 0 | 0 | 0 | 0.011 |
| 23 | Bayer Material Science Baydur STR/C-405 IMR, Polyurethane Composite SRIM Foam, 45% Glass Filled | 8.30E+09 | 0.35 | 1590 | 1.03E+08 | 0.00003 | 4.73 | 0.00509 |
| 35 | Bayer Material Science Baydur STR/C-400 BB, Polyurethane Composite SRIM Foam, 60% Glass Filled | 1.50E+10 | 0.35 | 1710 | 2.21E+08 | 0.00001 | 4.73 | 0.0039 |

TABLE 12

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 12 | Model 3 | | PolyOne Fiberloc 97530 Vinyl Compound-Rigid (RPVC), Glass Filled | 7.76E+09 | 0.38 | 1620 | 6.26E+07 | 0.00003 | 3.52 |
| 24 | Model 3 | | PolyOne Fiberloc 97530 Vinyl Compound-Rigid (RPVC), Glass Filled | 7.76E+09 | 0.38 | 1620 | 6.26E+07 | 0.00003 | 3.52 |

TABLE 12-continued

| Case | | | | | | | | |
|---|---|---|---|---|---|---|---|---|
| 36 | Model 3 | | PolyOne Fiberloc 97530 Vinyl Compound- Rigid (RPVC), Glass Filled | 7.76E+09 | 0.38 | 1620 | 6.26E+07 | 0.00003 | 3.52 |

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 12 | none | 0 | 0 | 0 | 0 | 0 | 0 | 0.00998 |
| 24 | Bayer Material Science Baydur STR/C-405 IMR, Polyurethane Composite SRIM Foam, 45% Glass Filled | 8.30E+09 | 0.35 | 1590 | 1.03E+08 | 0.00003 | 4.73 | 0.00479 |
| 36 | Bayer Material Science Baydur STR/C-400 BB, Polyurethane Composite SRIM Foam, 60% Glass Filled | 1.50E+10 | 0.35 | 1710 | 2.21E+08 | 0.00001 | 4.73 | 0.00371 |

TABLE 13

| Case | Geometric Configuration | Pictoral Image | Structure Material | Structure Modulus [N/m2] | Structure Poisson Ratio | Structure Density [kg/m3] | Structure Yield Strength [N/m2] | Structure CTE [/Kdeg] | Structure Cross Sectional Area [in2] |
|---|---|---|---|---|---|---|---|---|---|
| 37 | Model 4 | | North Wood Plastics HDPE with 20% Wood Fiber | 1.70E+09 | 0.38 | 1003 | 1.70E+07 | 0.00E+00 | 8.25 |
| 38 | Model 4 | | North Wood Plastics HDPE with 40% Wood Fiber | 2.70E+09 | 0.38 | 1054 | 1.80E+07 | 0.00E+00 | 8.25 |
| 39 | Model 4 | | North Wood Plastics HDPE with 60% Wood Fiber | 4.40E+09 | 0.38 | 1158 | 1.60E+07 | 0.00E+00 | 8.25 |
| 40 | Model 4 | | North Wood Plastics HDPE + UNIFILL 60 (20% Wood Fiber) | 1.80E+09 | 0.38 | 994 | 1.50E+07 | 0 | 8.25 |
| 41 | Model 4 | | North Wood Plastics HDPE + UNIFILL 60 (40% Wood Fiber) | 3.80E+09 | 0.38 | 1071 | 1.50E+07 | 0 | 8.25 |

| Case | Core Material | Core Modulus [N/m2] | Core Poisson Ratio | Core Density [kg/m3] | Core Yield Strength [N/m2] | Core CTE [/Kdeg] | Core Cross Sectional Area [in2] | Maximum Deflection [in] |
|---|---|---|---|---|---|---|---|---|
| 37 | n/a | 0 | 0 | 0 | 0 | 0 | 0 | 0.0223 |
| 38 | n/a | 0 | 0 | 0 | 0 | 0 | 0 | 0.014 |
| 39 | n/a | 0 | 0 | 0 | 0 | 0 | 0 | 0.00861 |
| 40 | n/a | 0 | 0 | 0 | 0 | 0 | 0 | 0.0211 |
| 41 | n/a | 0 | 0 | 0 | 0 | 0 | 0 | 0.00997 |

What is claimed is:

1. A method of making a foam member comprising the steps of:
    determining a volume expansion of an unexpanded foam material from a liquid to a solid;
    incorporating chopped fibers and substantially incompressible filler material into said foam material to form a foam mixture in an amount wherein said incompressible filler material comprises a volume ratio of 20% to 80% with respect to an expanded volume of said foam mixture;
    feeding said foam mixture through a die, wherein said foam mixture locates in a deformable structural material, said step of feeding after said step of determining said volume expansion of said foam material for preventing swelling of said deformable structural material;
    expanding said foam mixture;
    wherein said fibers contact and adhere to at least some of said filler material to act as anchoring members to said fibers;
    adjusting a selected amount of said filler material in said foam mixture to achieve a coefficient of thermal expansion of said foam mixture that reduces shear stress between said foam mixture and said deformable structural material for preventing delamination of said foam mixture from said deformable structural material.

2. The method according to claim 1 wherein said fibers are selected from a group consisting of natural, man-made, synthetic and mineral fibers.

3. The method according to claim 1 wherein:
    said fibers comprise greater than approximately 4% by weight of said foam material.

4. The method according to claim 1 wherein:
    said volume ratio is 20% to 50%.

5. The method according to claim 1 wherein:
    said volume ratio is 40% to 80%.

6. A method of making a member comprising the steps of:
    determining a volume expansion of a foam material from a liquid to a solid;
    incorporating fibers and rigidly solid substantially incompressible filler material into said foam material to form a foam mixture in an amount wherein said filler material comprises a volume ratio that adjusts said volume expansion of said foam mixture to reduce shear stress between said foam mixture and a deformable structural material;
    introducing said foam mixture through a die, wherein said foam mixture locates in said deformable structural material, said step of introducing after said step of determining said volume expansion of said foam material for preventing swelling of said deformable structural material;
    wherein said fibers contact and interact with at least some of said filler material, said filler material acting as anchoring members to anchor said fibers in said foam mixture, thereby strengthening the member;
    wherein said rigidly solid incompressible filler material interacts with said fibers throughout said foam mixture.

7. The method according to claim 6 wherein:
    said volume ratio of said filler material is 20% to 80% with regard to said volume expansion of said foam mixture.

8. The method according to claim 6 wherein said filler material comprises microspheres.

9. The method according to claim 6 wherein said fibers are selected from a group consisting of natural, man-made, synthetic and mineral fibers.

10. The method according to claim 6 wherein said foam material is a polyurethane composite foam.

11. The method according to claim 6 further comprising the steps of:
    extruding a structural material through a die to form an elongate structure that defines a durable outer shell;
    filling said durable outer shell with said foam material for forming a strengthened extruded composite member;
    wherein said fibers contact and interact with at least some of said filler material to act as anchoring members to said fibers.

12. The method according to claim 11 further comprising the steps of:
    determining the coefficient of thermal expansion of said structural material; and
    adjusting an amount of said filler material in said foam mixture to achieve a coefficient of thermal expansion of said foam mixture to reduce shear stress between said foam mixture and said deformable structural material.

13. The method according to claim 11 further comprising the steps of:
    determining the coefficient of thermal expansion of said structural material;
    adding a selected amount of said filler material to said foam material to achieve a coefficient of thermal expansion of said foam mixture to reduce shear stress between said foam mixture and said deformable structural material.

14. The method according to claim 6 wherein said rigidly solid incompressible filler material is selected from glass microspheres, ceramic microspheres, and mixtures thereof.

15. The method according to claim 6 wherein said rigidly solid incompressible filler material is selected from glass microspheres.

16. The method according to claim 6 wherein said rigidly solid incompressible filler material is selected from ceramic microspheres.

17. The method according to claim 6 wherein said rigidly solid incompressible material has a density of less than 40 lb./ft3.

18. The method according to claim 6 wherein:
    said step of introducing comprises injection molding.

19. The method according to claim 6 wherein:
    said step of introducing comprises cast molding.

20. The method according to claim 1 wherein:
    said deformable structural material is an outer shell created by said foam upon curing.

21. A method of making a foam member comprising the steps of:
    determining an expanded foam volume of an unexpanded mixture of an unexpanded polymer material, chopped fibers and substantially incompressible filler material;
    calculating an optimal feed rate of said unexpanded mixture for preventing a volume mismatch with respect to a deformable structural material;
    feeding said unexpanded mixture through a die and expanding said unexpanded mixture to form an expanded foam mixture, wherein said filler material comprises a volume ratio of 20% to 80% with respect to a volume of said expanded foam mixture, wherein said expanded foam mixture locates in said deformable structural material;
    wherein said step of feeding is after said step of determining said expanded foam volume for preventing swelling of said deformable structural material;

wherein said fibers contact and adhere to at least some of said filler material, said filler material acting as anchoring members to said fibers.

22. A method of making a member comprising the steps of:

determining an expanded foam volume of an unexpanded mixture of unexpanded polymer material, chopped fibers and substantially incompressible filler material;

calculating an optimal feed rate of said unexpanded mixture comprising said unexpanded polymer material, said fibers and said filler material for preventing a volume mismatch with respect to a deformable structural material;

introducing said unexpanded mixture through a die, wherein said unexpanded mixture expands to form an expanded foam mixture, wherein said filler material comprises a volume ratio that adjusts a volume of said expanded foam mixture, to reduce shear stress between said expanded foam mixture and a deformable structural material wherein said expanded mixture locates in said deformable structural material;

said step of introducing is after said step of determining said expanded foam volume for preventing swelling of said deformable structural material;

wherein said fibers contact and interact with at least some of said filler material, said filler material acting as anchoring members to anchor said fibers in said expanded foam mixture, for strengthening the member;

wherein said filler material interacts with said fibers throughout said expanded foam mixture;

adjusting a selected amount of said filler material in said unexpanded mixture to achieve a desirable coefficient of thermal expansion of said expanded foam mixture with respect to said deformable structural material for reducing a difference in a coefficient of thermal expansion between the expanded foam mixture and the deformable structural material for significantly reducing or preventing delamination of said expanded foam mixture from said deformable structural material.

* * * * *